United States Patent
Mitra et al.

(10) Patent No.: US 9,740,410 B2
(45) Date of Patent: Aug. 22, 2017

(54) MAXIMIZE IO THROUGHPUT IN HYBRID STORAGE SOLUTION

(71) Applicant: CacheBox Inc., San Carlos, CA (US)

(72) Inventors: Anand Mitra, Pune (IN); Dilip Ranade, Pune (IN); Sumit Kumar, Pune (IN); Sumit Kapoor, Pune (IN)

(73) Assignee: PrimaryIO, Inc., San Carlos, CA (US)

( * ) Notice: Subject to any disclaimer, the term of this patent is extended or adjusted under 35 U.S.C. 154(b) by 171 days.

(21) Appl. No.: 14/660,935

(22) Filed: Mar. 17, 2015

(65) Prior Publication Data

US 2015/0261449 A1    Sep. 17, 2015

Related U.S. Application Data

(60) Provisional application No. 61/954,019, filed on Mar. 17, 2014, provisional application No. 61/954,022, filed on Mar. 17, 2014.

(51) Int. Cl.
*G06F 3/06* (2006.01)
*G06F 12/00* (2006.01)

(52) U.S. Cl.
CPC ............ *G06F 3/0613* (2013.01); *G06F 3/061* (2013.01); *G06F 3/0655* (2013.01); *G06F 3/0659* (2013.01); *G06F 3/0665* (2013.01); *G06F 3/0685* (2013.01); *G06F 3/0688* (2013.01); *G06F 3/0689* (2013.01); *G06F 12/00* (2013.01); *G06F 2003/0692* (2013.01)

(58) Field of Classification Search
None
See application file for complete search history.

(56) References Cited

U.S. PATENT DOCUMENTS

| | | | | |
|---|---|---|---|---|
| 5,657,445 A | * | 8/1997 | Pearce | G06F 21/80 710/37 |
| 5,732,239 A | * | 3/1998 | Tobagi | G06F 3/061 348/E5.008 |
| 5,854,941 A | * | 12/1998 | Ballard | G06F 3/061 710/5 |
| 8,549,222 B1 | * | 10/2013 | Kleiman | G06F 3/0613 711/103 |
| 2001/0007148 A1 | * | 7/2001 | Murata | G06F 3/0613 717/170 |
| 2003/0056060 A1 | * | 3/2003 | Hertz | G06F 3/0613 711/112 |
| 2004/0128459 A1 | * | 7/2004 | Chanda | G06F 3/0613 711/167 |
| 2005/0289312 A1 | * | 12/2005 | Ghosal | G06F 3/0611 711/167 |
| 2008/0288947 A1 | * | 11/2008 | Gokhale | G06F 3/0613 718/103 |

(Continued)

*Primary Examiner* — Mano Padmanabhan
*Assistant Examiner* — Jean Edouard

(57) ABSTRACT

In an embodiment of the invention, an apparatus comprises: a hard disk drive input/output (HDD I/O) optimizer configured to receive a primary input/output (I/O) operation stream for a given cylinder in a permanent storage device, configured to schedule a secondary input/output (I/O) operation stream that is pending on the same given cylinder or that is pending on an adjacent cylinder that is adjacent to the given cylinder, and configured to allocate free space from the same given cylinder or from the adjacent cylinder for the secondary I/O operation stream that is pending.

23 Claims, 3 Drawing Sheets

(56) References Cited

U.S. PATENT DOCUMENTS

| | | | |
|---|---|---|---|
| 2012/0066435 A1* | 3/2012 | Colgrove | G06F 3/061 711/103 |
| 2012/0239857 A1* | 9/2012 | Jibbe | G06F 12/0246 711/103 |
| 2014/0281121 A1* | 9/2014 | Karamcheti | G06F 12/0246 711/102 |
| 2014/0379965 A1* | 12/2014 | Gole | G06F 12/0246 711/103 |

* cited by examiner

300

| Reads | Sequential | Random |
|---|---|---|
| HDD | 50K IOPs | 200 IOPs |
| SSD | 100K IOPs | 100K IOPs |

MAXIMIZE IO THROUGHPUT IN HYBRID STORAGE SOLUTION

CROSS-REFERENCE(S) TO RELATED APPLICATIONS

This application claims the benefit of and priority to U.S. Provisional Application 61/954,019, filed 17 Mar. 2014. This U.S. Provisional Application 61/954,019 is hereby fully incorporated herein by reference.

This application claims the benefit of and priority to U.S. Provisional Application 61/954,022, filed 17 Mar. 2014. This U.S. Provisional Application 61/954,022 is hereby fully incorporated herein by reference.

FIELD

Embodiments of the invention relate generally to data storage systems.

DESCRIPTION OF RELATED ART

The background description provided herein is for the purpose of generally presenting the context of the present disclosure. Work of the presently named inventors, to the extent the work is described in this background section, as well as aspects of the description that may not otherwise qualify as prior art at the time of filing, are neither expressly nor impliedly admitted as prior art against this present disclosure.

Various caching solutions are available for data storage systems. Typically, these caching solutions lack efficiency in a very complex and/or high volume data storage environment. Additionally, these caching solutions do not provide policies that utilize the data sets of applications and that also manage the scarce cache resource. Additionally, there is a continuing need for conventional systems to achieved improved performance.

While the above-noted systems are suited for their intended purpose(s), there is a continuing need for reliable data storage systems.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the invention are described with reference to the following figures, wherein like reference numerals refer to like parts throughout the various views unless otherwise specified.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
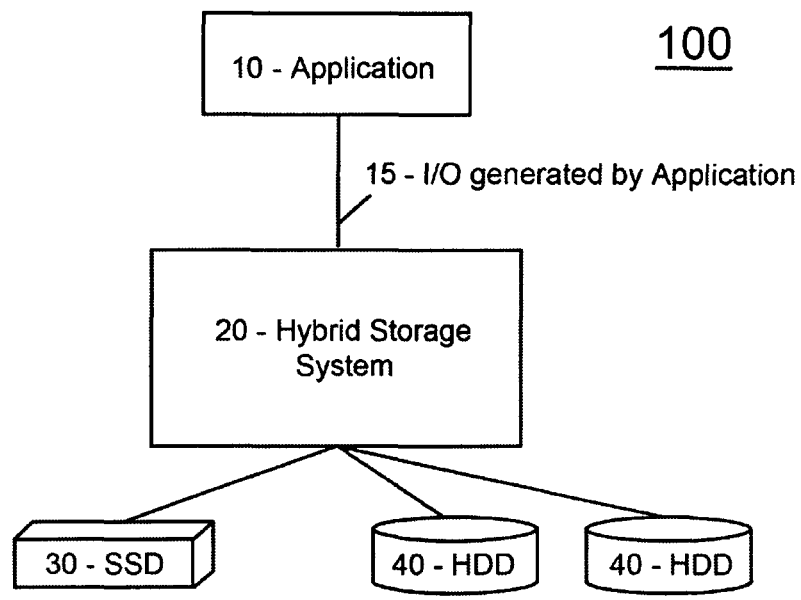
FIG. 1 is a block diagram of an apparatus (or system), in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

An exemplary embodiment of the invention provides an apparatus and/or method for block allocation alignment and/or for scheduling input/output (I/O) operations to ensure maximum aggregate I/O operations to a cylinder in a storage device. This apparatus and/or method results in a maximum throughput of I/O operations.

An apparatus and method also provides at least one or more of the following exemplary embodiments of the invention. A system in one embodiment of the invention provides a hybrid storage solution comprising mechanical hard disk drives (HDDs) as well as solid state disk (SSDs). The mix of at least one SSD and at least one HDD are to keep the costs low at the same time give near SSD performance for the system. In such systems a burst of heavy write workload can be handled at near SSD speed, but in a steady state of write workloads the performance degrades to that of the HDD. This happens because after the SSD has filled up the data has to be flushed/moved to the HDDs effectively reducing the speed of the entire system to the HDD performance levels.

The inventors have exploited a few key aspects of SSD and HDD performance. To a large extent the performance of SSDs are independent of the location within the SSD at which the input/output (I/O) operation stream is done, but this is not true for HDDs. For HDDs, an I/O operation stream to the same or adjacent cylinder is typically about 130 times faster than operations scattered randomly across the disk.

There are two I/O operation streams seen by the hybrid storage subsystem in an embodiment of the invention. A first type of I/O operation stream comprises an I/O operation stream(s) from the user application. This first type I/O operation stream has the highest priority as it impacts the observable system performance, and this first type of I/O operations stream is called herein as a "primary I/O stream" or "primary I/O streams". A second type of I/O operation stream is a tiering or caching I/O operation stream that is generated by the hybrid storage solution to manage the scarce SSD resource(s), and this second type of I/O operation stream is called herein as a "secondary I/O stream" or "secondary I/O streams". A secondary I/O stream does not have a direct impact on the application performance since the application is not directly waiting on these secondary I/O streams. The indirect impact is two fold. First, a secondary I/O stream is occupying high performance SSD space and secondly the flushing of a secondary I/O stream will reduce the HDD bandwidth available to the application (if I/O stream cannot be serviced from the SSD).

An exemplary embodiment of this invention maximizes the effective throughput of the system by running the slowest components (HDDs) at their maximum speed. This is achieved by doing most of the I/O stream to the HDD within the same cylinder by: (1) When a Primary I/O stream is received for a given cylinder, a system in an embodiment of the invention will opportunistically schedule a secondary I/O stream pending on the same cylinder (or on an adjacent cylinder); and (2) When a Primary I/O stream is received for a given cylinder, the system in an embodiment of the invention will allocate free space from the same cylinder (or the adjacent cylinder) for the secondary I/O stream. Following the above procedure or method will ensure I/O operation streams to HDDs are aggregated cylinder-wise, thus giving the maximum throughput possible.

For the above system or method to be possible, it is necessary to identify the cylinder boundaries. This information is typically available for most attached HDDs. This is not available for arrays or JBODs. In this case, passively observing the I/O operations stream latencies of the different I/O operation streams issued to the disk or LUN (logical unit) will allow an inference of the properties of the underlying disk or LUN.

FIG. 1 is a block diagram of an apparatus 100 (or system 100), in accordance with an embodiment of the invention. The apparatus 100 comprises a hybrid storage system 20 which is a storage system that is based on the novel features presented herein. The hybrid storage system 20 exposes storage space either as files or as block storage.

In an embodiment of the invention, the hybrid storage system 20 can be coupled to an application 10 and the hybrid storage system 20 can also be coupled to at least one SSD 30 and to at least one HDD 40. The SSD 30 comprises a cache 30 and/or operates as a cache 30 in the apparatus 100.

The application 20 can be any user application (e.g., software application or firmware) that is consuming the storage provided by the hybrid storage system 20. The application 20 can be, for example, a virtualization server application, a database application, a web application, or another suitable type of application. The application 20 functions by making read and write requests to the hybrid storage system 20.

The solid state disk(s) 30 has the ability to handle a much higher number of random input/output (I/O) operations 15 from the application 10. For example, an SSD 30 can handle I/O operations 15 at least 300 more times than the I/O operations 15 handled by an HDD 40.

The HDD(s) 40 is a mechanical rotating disk. Due to the physical limitations of rotation speeds and disk arm movement, an HDD 40 has much higher latencies resulting in a low number of random I/O operations 15 that are generated by the application 10 and that can be handled by an HDD 40. Typically, the I/O operations 15 handled by an HDD 40 are at least 300 times lower than the I/O operations 15 handled by an SSD 30.

Figure 2:
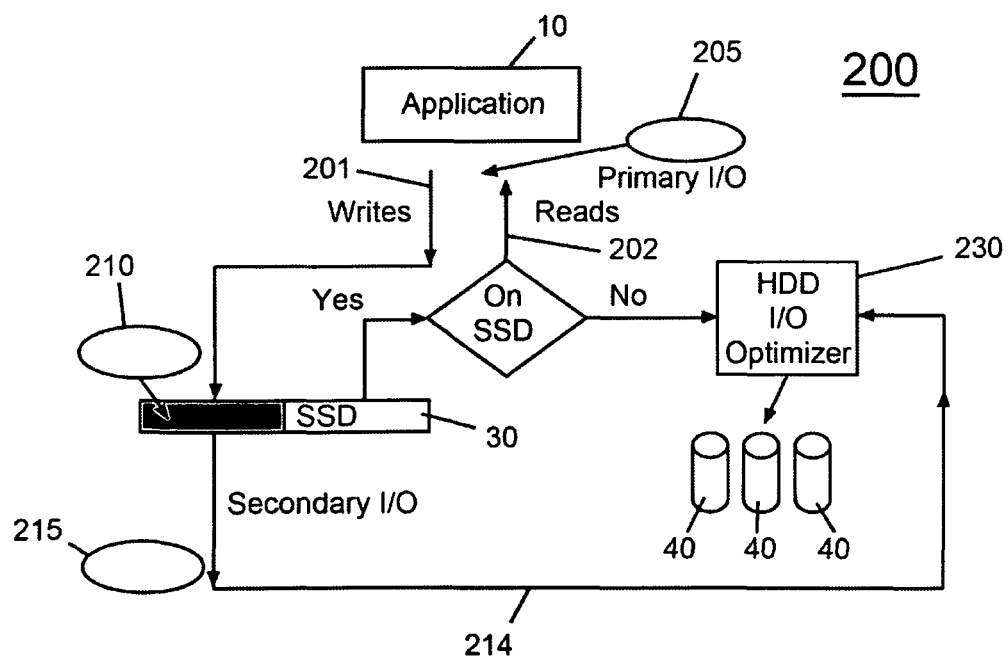
FIG. 2 is a functional block diagram of an apparatus (system) for processing input/output (I/O) operation streams generated by an application, in accordance with an embodiment of the invention.

FIG. 2 is a functional block diagram of an apparatus 200 (system 200) for processing input/output (I/O) operation streams generated by an application, in accordance with an embodiment of the invention. The application 10 generates at least one primary I/O operation stream 205 (primary I/O stream 205). The performance of the application 10 depends on how well these primary I/O streams 205 can be serviced. The I/O operation streams includes writes 201 and reads 202 from the application 10. Writes 201 from the application 10 can be most easily serviced by writing to the SSD 30, while reads 202 from the application 10 will access data that may or may not be present in the SSD 30. Therefore, the reads 202 will access data that may be present in at least one HDD 40.

Over a short time amount, data 210 will accumulate on the SSD 30 which is no longer used and needs to be moved to an HDD 40, or dirty data (from a write by the application 10) that needs to be moved to the HDD 40. By moving the no longer use data 210 or dirty data from the SSD 30 to the HDD 30, free space will be available in the SSD 30, wherein the free space in the SSD 30 can store other data from writes from the application 10. In a caching system, dirty data is defined as the data that is present in the cache (which is the SSD 30 in FIG. 2), but not in the primary storage, and is data that is being cached.

SSDs 30 are faster than HDDs 40 and dirty data and unused data will accumulate in an SSD 30. Unused data 210 in the cache (SSD 30 in this example) refers to data in the cache which is no longer being accessed by the application 10.

The dirty data and unused data are flushed from the SSD 30 to the HDD 40 in the background. The I/O operation streams generated in this process of managing the space in the SSD 30 is called a secondary I/O operation stream 215 (secondary I/O stream 215) from the SSD 30 to the HDD I/O optimizer 230. Therefore, in an embodiment of the invention, the secondary I/O operation stream 215 comprises data flushed from the SSD 30 (i.e., a cache 30) to an HDD 40 (i.e., a permanent storage device 40) typically during a background operation.

In an embodiment of the invention, the system 200 also includes an HDD I/O optimizer 230 which receives and processes the primary I/O operation streams 205 and secondary I/O operation streams 215, as will be discussed below in further details. An exemplary embodiment of the HDD I/O optimizer 230 is also discussed below as an HDD I/O optimizer 400 with reference to FIG. 4.

Figures 3, 4:
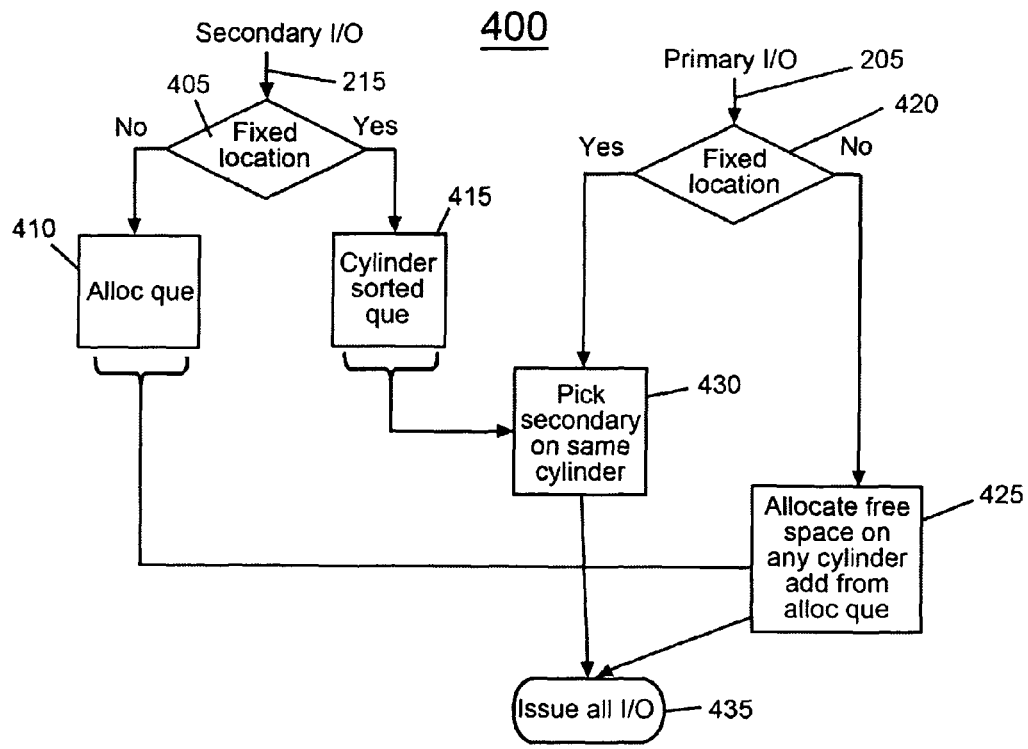
FIG. 3 is a table depicting example input/output operations (IOPs) to hard disk drives (HDDs) and to solid state disks (SSDs).
FIG. 4 is a functional block diagram of a hard disk drive input/output (HDD I/O) optimizer, in accordance with an embodiment of the invention.

FIG. 3 is a table 300 depicting example input/output operations (IOPs) to hard disk drives (HDDs) and to solid state disks (SSDs). The table 300 depicts typical input/output operation streams of an HDD as compared to an SSD.

The exact number of I/O operation streams will vary from vendor to vendor but the order of magnitude will hold. The key observation is that the only way HDDs can perform comparably to SSDs is by converting as much I/O operation streams as possible to sequential access across the disk. Any medium which exhibits this disparity in sequential access across the disk to random access across the disk can be exploited for embodiments of this invention.

In the example of table 300, I/O operations streams that are reads to an HDD will be approximately 50,000 I/O operation streams for sequential access across the HDD, and will be 200 I/O operation streams for random access across the HDD.

In the example of table 300, I/O operations streams that are reads to an SSD will be approximately 100,000 I/O operation streams for sequential access across the SSD, and will be 100,000 I/O operation streams for random access across the SDD.

FIG. 4 is a functional block diagram of a hard disk drive input/output (HDD I/O) optimizer 400, in accordance with an embodiment of the invention. This optimizer 400 can be implemented as the optimizer 230 in the apparatus 200 in FIG. 2. The optimizer 400 receives the primary I/O operation streams 205 and secondary I/O operation streams 215. In the HDD I/O optimizer 400, the block 405 determines if the secondary I/O operation stream 215 needs to be written to a specific fixed location in an HDD 40 (i.e., permanent storage device 40) or if the secondary I/O operation stream 215 can be written to free unused space in the HDD 40 (i.e., permanent storage device 40).

The secondary I/O operation stream 215 would be typically of the format <HDD Addr/ANY, data, None/Handle>. If the data is to be placed at a specific fixed location (i.e., specific fixed address on the HDD 40 or HDD address) in the HDD 40, the $1^{st}$ parameter value "HDD Addr" would be provided and the $3^{rd}$ parameter in the tuple for the Handle would be "None". If the data can be placed anywhere in the HDD 40, the $1^{st}$ parameter item value in the tuple would be "ANY" and the Handle is passed back to the application 10 along with the actual location where the data is written in the permanent storage device 40 (HDD 40).

The location in any storage medium are addressed using a numerical address and is denoted as "HDD addr" herein.

The secondary data in a secondary I/O operation stream 215 is all data generated by SSD 30 for the purpose of flushing the cache 30. All data stored in the SSD 30 are stored as a tuple <HDD addr, data, None> which provides an indication of where the data is to be written to the HDD 40. The third parameter (shown currently as "None") in the tuple is used only in the case where the request was to put the data in any free space.

The request would explicitly indicate the fixed location if the secondary I/O operation stream 215 is to be written in a fixed location in one of the HDDs 40. If the secondary I/O operation stream 215 is not for a fixed location, then the request would indicate "ANY" in a tuple. The application 10 would indicate if the data can be stored in any free HDD address (in permanent storage device 40). Therefore, the above tuple would instead have a third parameter value "Handle" in the following tuple <ANY, Data, Handle>. The Handle is passed back to the application 10 along with the actual location where the data is written in the permanent storage device 40 (HDD 40).

If the secondary I/O operation stream 215 can be written to the free unused space on the HDD 40 (i.e., the secondary I/O operation stream 215 does not have a specific location for write), then the optimizer 400 places and leaves the secondary I/O operation stream 215 in an allocation queue 410. Block 425 then allocates free space on any cylinder in one of the HDDs 40 and writes the secondary I/O operation stream 215 in the allocation queue 410 to that allocated free space in one of the HDDs 40 (in one of the permanent storage devices 40) typically during a background operation.

If the secondary I/O operation stream 215 needs to be written to a specific fixed location in the HDD 40, then the optimizer places and leaves the secondary I/O operation stream 215 in one of the cylinder sorted queues 415, where each queue 415 is for a corresponding group of adjacent cylinders in the HDD 40. Alternatively, each one of the queues 415 is for a corresponding cylinder. When the secondary I/O operation streams 215 are issued and received by the optimizer 400, the streams 215 are left in a queue (e.g., queues 410 or 415) and the secondary I/O operation stream 215 is not initiated and not yet scheduled for processing.

Regarding the cylinder sorted queues 415, there would be one cylinder sorted queue 415 for every cylinder in the HDD 40 (or for a corresponding group of adjacent cylinders). A given HDD addr would be on a cylinder, and the tuple would be placed on the cylinder sorted queue on which the HDD addr belongs.

The information on cylinder boundaries is typically available for most attached HDDs. It is also known in the construction of mechanical disks that there are multiple platters and a head assembly with multiple heads which move in unison over all the platters. At any point in time, the multiple heads would be over tracks on each of the platters. The data from these tracks on the platter can be read concurrently.

The allocation queue 410 holds tuples which have HDD addr as "ANY" (i.e. the data can be placed on any free location in the HDD 40). In contrast, the cylinder sorted queues 415 have tuples with a specific HDD addr as similarly discussed above.

In optimizer 400, the block 420 determines if the primary I/O operation stream 205 needs to be written to a specific fixed location in the HDD 40 or if the secondary I/O operation stream 215 can be written to the free unused space in the HDD 40. The request would explicitly mention the fixed location. If it is not for a fixed location then the request would indicate "ANY" in the tuple as similarly discussed above.

If the primary I/O operation stream 205 can be written to the free unused space in the HDD 40 (permanent storage device 40) (i.e., the primary I/O operation stream 205 does not have a specific location for write), then the block 425 will find a cylinder with enough free space to hold the current Primary I/O operation stream 205 and to also hold a reasonable number of secondary I/O operation streams 215 from the allocation queue 410. The block 425 will then allocate free space on the cylinder found by the block 425 and the block 425 will then schedule all writes (related to the primary I/O operation stream 205 and to the reasonable number of secondary I/O operation streams 215 from the allocation queue 410) to this allocated free space in the found cylinder in an HDD 40.

If the primary I/O operation stream 205 needs to be written to a specific fixed location in the HDD 40 (permanent storage device 40), then block 430 picks the primary I/O operation stream 205 and secondary I/O operations streams 215 in a cylinder sorted queue 415 corresponding to a cylinder number (or cylinder numbers) that is/are adjacent to (or is the same cylinder as) the fixed specific location on the HDD 40 wherein the primary I/O operation stream 205 will be written to that fixed specific location. The block 430 will schedule together the following: the primary I/O operation stream 205 and the secondary I/O operation streams 215 in the cylinder sorted queue 415 corresponding to a cylinder number (or cylinder numbers) that is/are adjacent to (or is the same cylinder as) the fixed location on which the primary I/O operation stream 205 is to be written.

For a given disk the range of address, which falls on a given cylinder, is known. All such I/O operations streams on the same cylinder will be on the same cylinder sorted queue 415. When these I/O operation streams are issued back-to-back, block 430 will schedule these I/O operation streams together.

In block 435, all I/O operation streams from the application 10 have been scheduled by the optimizer 400 and issued.

Figure 5:
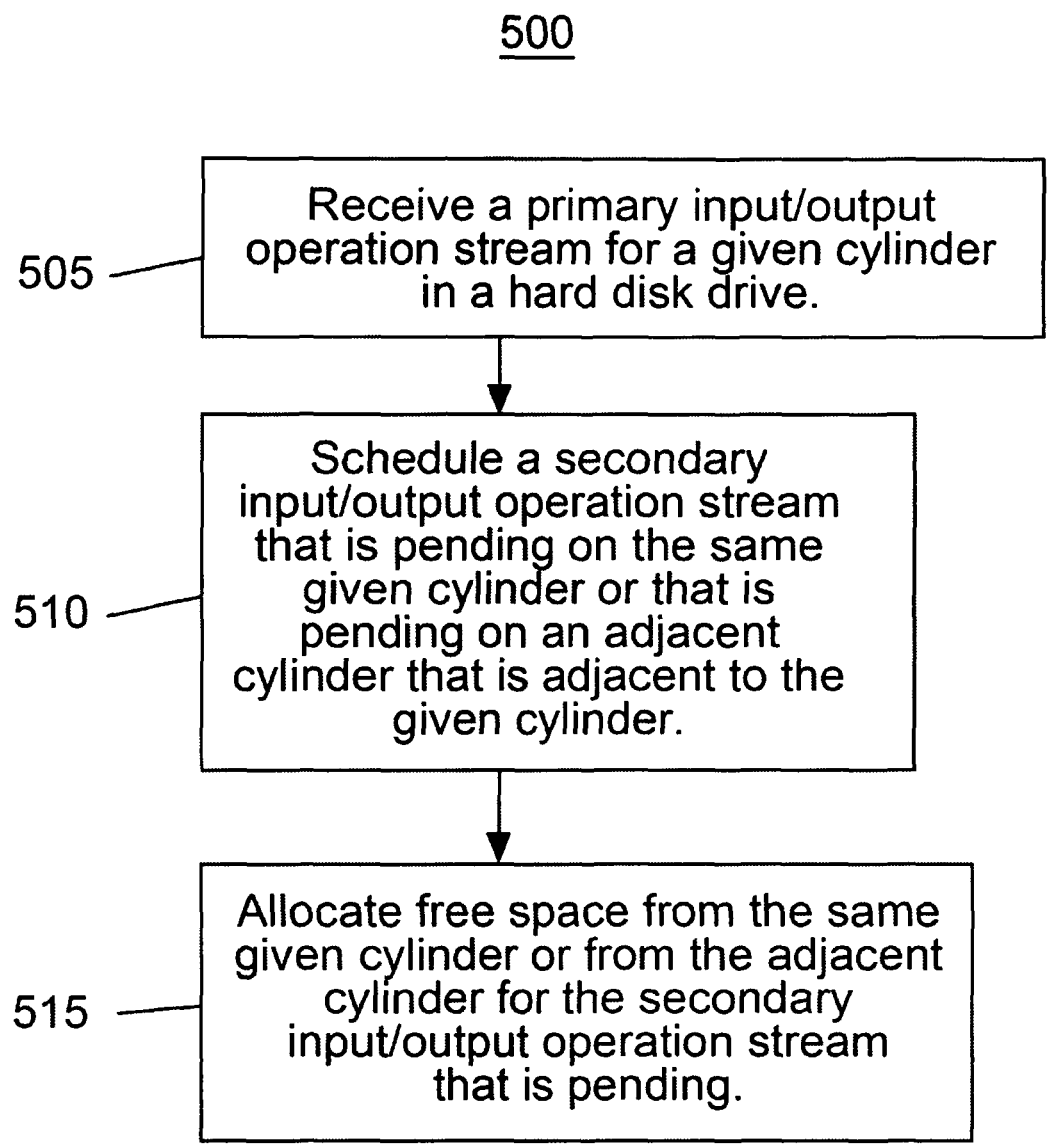
FIG. 5 is a flow diagram of a method in accordance with an embodiment of the invention.

FIG. 5 is a flow diagram of a method 500 in accordance with an embodiment of the invention.

At 505, a primary input/output (I/O) operation stream for a given cylinder in a hard disk drive (i.e., permanent storage device) is received.

At 510, a secondary input/output (I/O) operation stream that is pending on the same given cylinder or that is pending on an adjacent cylinder that is adjacent to the given cylinder is scheduled.

At 515, free space from the same given cylinder or from the adjacent cylinder for the secondary I/O operation stream that is pending is allocated.

Other steps, as similarly discussed above, can be added in the method 500.

Accordingly, in an embodiment of the invention, an apparatus comprises: a hard disk drive input/output (HDD I/O) optimizer configured to receive a primary input/output (I/O) operation stream for a given cylinder in a permanent storage device, configured to schedule a secondary input/output (I/O) operation stream that is pending on the same given cylinder or that is pending on an adjacent cylinder that is adjacent to the given cylinder, and configured to allocate free space from the same given cylinder or from the adjacent cylinder for the secondary I/O operation stream that is pending.

In yet another embodiment of the invention, a method comprises: receiving a primary input/output (I/O) operation stream for a given cylinder in a permanent storage device; scheduling a secondary input/output (I/O) operation stream that is pending on the same given cylinder or that is pending on an adjacent cylinder that is adjacent to the given cylinder; and allocating free space from the same given cylinder or from the adjacent cylinder for the secondary I/O operation stream that is pending.

In yet another embodiment of the invention, an article of manufacture comprises: a non-transient computer-readable medium having stored thereon instructions that permit a method comprising: receiving a primary input/output (I/O) operation stream for a given cylinder in a permanent storage device; scheduling a secondary input/output (I/O) operation stream that is pending on the same given cylinder or that is pending on an adjacent cylinder that is adjacent to the given cylinder; and allocating free space from the same given cylinder or from the adjacent cylinder for the secondary I/O operation stream that is pending.

In yet another embodiment of the invention, the article of manufacture comprises the non-transient computer-readable medium having stored thereon instructions that permit a method further comprising: permitting the application to be aware of a distribution of data of the application across a cache and the permanent storage device. The application 10 is aware of a distribution of data of the application across a cache (e.g., SSD 30) and a permanent storage device (e.g., permanent storage device 40 such as an HDD).

In yet another embodiment of the invention, a method further comprises: permitting the application to be aware of a distribution of data of the application across a cache and the permanent storage device.

In yet another embodiment of the invention, the apparatus further comprises: a caching application program interface configured to permit the application to be aware of a distribution of data of the application across a cache and the permanent storage device. For example, the caching application program interface is the caching API 250 which is similarly described in commonly-owned commonly-assigned U.S. patent application Ser. No. 14/660,931, by Sumit Kumar and Sumit Kapoor, filed on 17 Mar. 2015, and entitled "Tier Aware Caching Solution To Increase Application Performance" which is hereby fully incorporated herein by reference.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable (or non-transient computer-readable medium) having stored thereon instructions that permit a method (or that permit a computer) to perform any of the inventive techniques described above, or a program or code that can be stored in an article of manufacture that includes a non-transient computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
   receiving a primary input/output (I/O) operation stream for a given cylinder among a group of adjacent cylinders in a permanent storage device and receiving a secondary I/O operation stream;
   wherein the primary I/O operations stream impacts observable system performance and wherein the secondary I/O operation stream does not have a direct impact on application performance;

wherein the secondary I/O operation stream occupies space in a cache comprising a solid state disk;

scheduling together both the primary I/O operation stream and a secondary input/output (I/O) operation stream for writing to the permanent storage device wherein the secondary I/O operation stream is pending on the given cylinder or is pending on another cylinder among the group of adjacent cylinders; and allocating free space from the given cylinder or from the another cylinder among the group of adjacent cylinders for the secondary I/O operation stream that is pending and writing the I/O operation streams to the permanent storage device so that the I/O operation streams to the permanent storage device are aggregated.

2. The method of claim 1 wherein the primary I/O operation stream is a write or read request generated by an application.

3. The method of claim 1 wherein the secondary I/O operation stream comprises data flushed from a cache to the permanent storage device.

4. The method of claim 1, further comprising:
determining if the primary I/O operation stream needs to be written to a specific fixed location on the permanent storage device or if the primary I/O operation stream can be written to free unused space in the permanent storage device.

5. The method of claim 4, wherein:
if the primary I/O operation stream can be written to free unused space in the permanent storage device, then finding a cylinder with enough free space to hold the primary I/O operation stream and to also hold at least the secondary I/O operation stream from an allocation queue and additional secondary I/O operations streams from the allocation queue;
allocating free space on the cylinder with enough free space; and
scheduling the primary I/O operation stream and secondary I/O operation streams 215 from the allocation queue to the free space.

6. The method of claim 4 wherein:
if the primary I/O operation stream needs to be written to a specific fixed location in the permanent storage device, then scheduling the primary I/O operation stream and secondary I/O operations streams in a cylinder sorted queue corresponding to a cylinder number that is adjacent to (or is the cylinder as) the specific fixed location on the permanent storage device, wherein the primary I/O operation stream will be written to that specific fixed location.

7. The method of claim 1, further comprising:
determining if the secondary I/O operation stream needs to be written to a specific fixed location on the permanent storage device or if the primary I/O operation stream can be written to free unused space in the permanent storage device.

8. The method of claim 7, wherein:
if the secondary I/O operation stream can be written to free unused space in the permanent storage device, then storing the secondary I/O operation stream in an allocation queue;
allocating free space on any cylinder in the permanent storage device; and
writing the secondary I/O operation stream in the allocation queue to that allocated free space in the permanent storage device.

9. The method of claim 7, wherein:
if the secondary I/O operation stream needs to be written to a specific fixed location in the permanent storage device, then placing the secondary I/O operation stream a cylinder sorted queue, wherein the cylinder sorted queue is for a corresponding cylinder in the permanent storage device.

10. An apparatus, comprising:
a hybrid storage system comprising a hard disk drive input/output (HDD I/O) optimizer and a cache comprising a solid state disk, wherein the optimizer is configured to receive and process a primary input/output (I/O) operation stream and a secondary I/O operation stream,
wherein the primary I/O operations stream impacts observable system performance and wherein the secondary I/O operation stream does not have a direct impact on application performance,
wherein the secondary I/O operation stream occupies space in the cache,
wherein the optimizer is configured to receive the primary input/output (I/O) operation stream for a given cylinder among a group of adjacent cylinders in a permanent storage device, is configured to schedule together both the primary I/O operation stream and the secondary input/output (I/O) operation stream for writing to the permanent storage device wherein the secondary I/O operation stream is pending on the given cylinder or is pending on another cylinder among the group of adjacent cylinders, and is configured to allocate free space from the given cylinder or from the another cylinder among the group of adjacent cylinders for the secondary I/O operation stream that is pending, and is configured to write the I/O operation streams to the permanent storage device so that the I/O operation streams to the permanent storage device are aggregated.

11. The apparatus of claim 10 wherein the primary I/O operation stream is a write or read request generated by an application.

12. The apparatus of claim 10 wherein the secondary I/O operation stream comprises data flushed from a cache to the permanent storage device.

13. The apparatus of claim 10, wherein the optimizer is configured to determine if the primary I/O operation stream needs to be written to a specific fixed location on the permanent storage device or if the primary I/O operation stream can be written to free unused space in the permanent storage device.

14. The apparatus of claim 13, wherein:
if the primary I/O operation stream can be written to free unused space in the permanent storage device, then the optimizer is configured to find a cylinder with enough free space to hold the primary I/O operation stream and to also hold at least the secondary I/O operation stream from an allocation queue and additional secondary I/O operations streams from the allocation queue, to allocate free space on the cylinder with enough free space, and to schedule the primary I/O operation stream and secondary I/O operation streams 215 from the allocation queue to the free space.

15. The apparatus of claim 13, wherein:
if the primary I/O operation stream needs to be written to a specific fixed location in the permanent storage device, then the optimizer is configured to schedule the primary I/O operation stream and secondary I/O operations streams in a cylinder sorted queue corresponding to a cylinder number that is adjacent to (or is the cylinder as) the specific fixed location on the permanent storage device, wherein the primary I/O operation stream will be written to that specific fixed location.

16. The apparatus of claim 10, wherein the optimizer is configured to determine if the secondary I/O operation stream needs to be written to a specific fixed location on the permanent storage device or if the primary I/O operation stream can be written to free unused space in the permanent storage device.

17. The apparatus of claim 16, wherein:
if the secondary I/O operation stream can be written to free unused space in the permanent storage device, then the optimizer is configured to store the secondary I/O operation stream in an allocation queue, to allocate free space on any cylinder in the permanent storage device, and to write the secondary I/O operation stream in the allocation queue to that allocated free space in the permanent storage device.

18. The apparatus of claim 16, wherein:
if the secondary I/O operation stream needs to be written to a specific fixed location in the permanent storage device, then the optimizer is configured to place the secondary I/O operation stream a cylinder sorted queue, wherein the cylinder sorted queue is for a corresponding cylinder in the permanent storage device.

19. An article of manufacture, comprising:
a non-transitory computer-readable medium having stored thereon instructions operable to permit an apparatus to:
receive a primary input/output (I/O) operation stream for a given cylinder among a group of adjacent cylinders in a permanent storage device and receive a secondary I/O operation stream;
wherein the primary I/O operations stream impacts observable system performance and wherein the secondary I/O operation stream does not have a direct impact on application performance;
wherein the secondary I/O operation stream occupies space in a cache comprising a solid state disk;
schedule together both the primary I/O operation stream and a secondary input/output (I/O) operation stream for writing to the permanent storage device wherein the secondary I/O operation stream is pending on the given cylinder or is pending on another cylinder among the group of adjacent cylinders; and
allocate free space from the given cylinder or from the another cylinder among the group of adjacent cylinders for the secondary I/O operation stream that is pending and write the I/O operation streams to the permanent storage device so that the I/O operation streams to the permanent storage device are aggregated.

20. The article of manufacture of claim 19, wherein the method further comprises:
wherein if the primary I/O operation stream needs to be written to a specific fixed location in the permanent storage device, then scheduling the primary I/O operation stream and secondary I/O operations streams in a cylinder sorted queue corresponding to a cylinder number that is adjacent to (or is the same cylinder as) the specific fixed location on the permanent storage device, wherein the primary I/O operation stream will be written to that specific fixed location.

21. The article of manufacture of claim 19, wherein the method further comprises: permitting the application to be aware of a distribution of data of the application across a cache and the permanent storage device.

22. The method of claim 1, further comprising:
permitting the application to be aware of a distribution of data of the application across a cache and the permanent storage device.

23. The apparatus of claim 10, further comprising:
a caching application program interface configured to permit the application to be aware of a distribution of data of the application across a cache and the permanent storage device.

* * * * *